(12) United States Patent
Chiang (10) Patent No.: US 8,564,222 B2
(45) Date of Patent: Oct. 22, 2013

(54) LIGHTING DEVICE CONTROLLING CIRCUIT MODULE

(75) Inventor: Wei-Cheng Chiang, Taichung (TW)

(73) Assignee: Shenzhen Tention Optoectronic Co., Ltd. (CN)

( * ) Notice: Subject to any disclaimer, the term of this patent is extended or adjusted under 35 U.S.C. 154(b) by 259 days.

(21) Appl. No.: 13/205,868

(22) Filed: Aug. 9, 2011

(65) Prior Publication Data

US 2013/0038239 A1 Feb. 14, 2013

(51) Int. Cl.
| | |
|---|---|
| G05F 1/00 | (2006.01) |
| H05B 37/02 | (2006.01) |
| H05B 39/04 | (2006.01) |
| H05B 41/36 | (2006.01) |
| H05B 37/00 | (2006.01) |
| H05B 39/00 | (2006.01) |
| H05B 41/14 | (2006.01) |
| H05B 41/16 | (2006.01) |
| H05B 41/24 | (2006.01) |

(52) U.S. Cl.
USPC .................. 315/294; 315/200 R; 315/247

(58) Field of Classification Search
None
See application file for complete search history.

(56) References Cited

U.S. PATENT DOCUMENTS

2011/0080102 A1* 4/2011 Ge et al. .................... 315/200 R
2011/0234092 A1* 9/2011 Marinus et al. ................ 315/35

* cited by examiner

*Primary Examiner* — Douglas W Owens
*Assistant Examiner* — Dedei K Hammond (57) ABSTRACT

The present invention relates to a lighting device controlling circuit module, comprising: a first bridge rectifier unit, a second bridge rectifier unit, a power factor correction unit, a controlling unit, a feedback unit, at least one switching unit, and at least one boost/buck unit. The lighting device controlling circuit module of the present invention can be made as an electronic chip for easily being integrated into an LED fluorescent lamp, therefore, a user can replace the traditional fluorescent lamp with the LED fluorescent lamp having the lighting device controlling circuit module so easily, and the user does not need to identify which two contacts of the LED fluorescent lamp are used as the power-inputting terminal before replacing the traditional fluorescent lamp by the LED fluorescent lamp.

10 Claims, 7 Drawing Sheets

FIG. 7

LIGHTING DEVICE CONTROLLING CIRCUIT MODULE

BACKGROUND OF THE INVENTION

1. Technical Field

The present invention relates to a controlling circuit module, and more particularly, to a lighting device controlling circuit module capable of being integrated with a light-emitting diode (LED) fluorescent lamp.

2. Description of Related Art

Fluorescent lamp is a bright and soft light source, which is applied in everywhere, such as homes, shops, offices, schools, supermarkets, hospitals, commercial freezers, advertising light boxes, metro, pedestrian tunnels, night market, etc. Generally, for controlling the fluorescent lamp to emit light or stop emitting light, a start circuit must to be used in fluorescent lamp framework.

Figure 1:
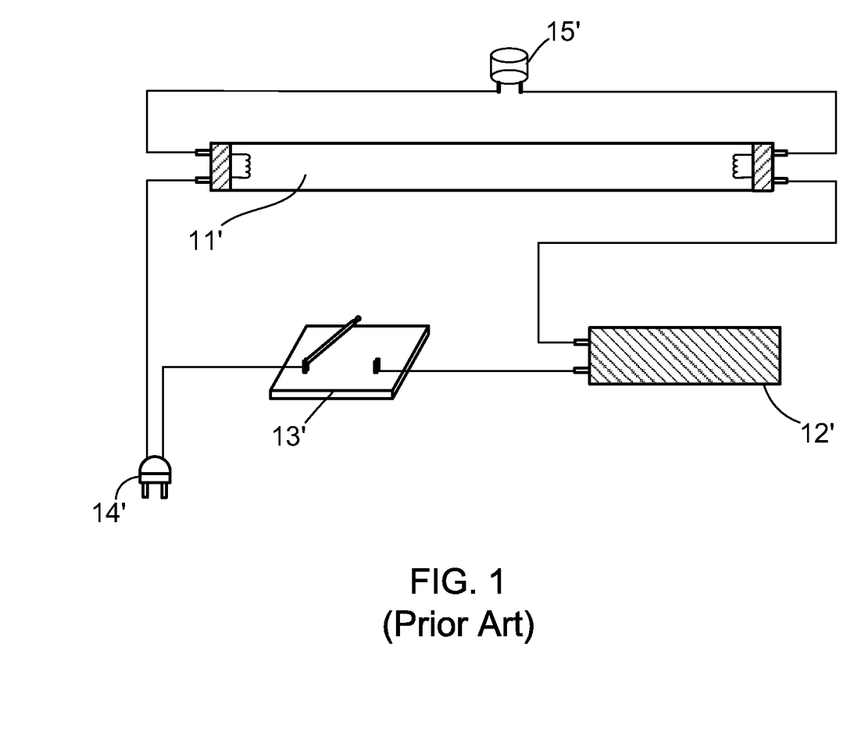
FIG. 1 is a framework view of a conventional fluorescent lamp start circuit.

Please refer to FIG. 1, which illustrates a framework view of a conventional fluorescent lamp start circuit. As shown in FIG. 1, the conventional fluorescent lamp start circuit framework includes: a ballast 12', a power switch 13', a power source 14, and a starter 15', wherein a fluorescent lamp 11' is coupled to the ballast 12', the power source 14 and the starter 15', and the power switch 13' is disposed between the power source 14 and the ballast 12'.

Everyone knows that, the conventional fluorescent lamp start circuit has a poor power usage resulted from high-voltage starting way thereof. Besides, since the fluorescent lamp 11' lights by way of the electrons discharge, the fluorescent lamp 11' and the starter 15' become consumables and need to be regularly replaced. Actually, it is not hard for the common people to replace the fluorescent lamp 11' or the starter 15' by a new one; however, it is difficult for the common people to replace the ballast 12' when the ballast 12' is damaged.

Figure 2:
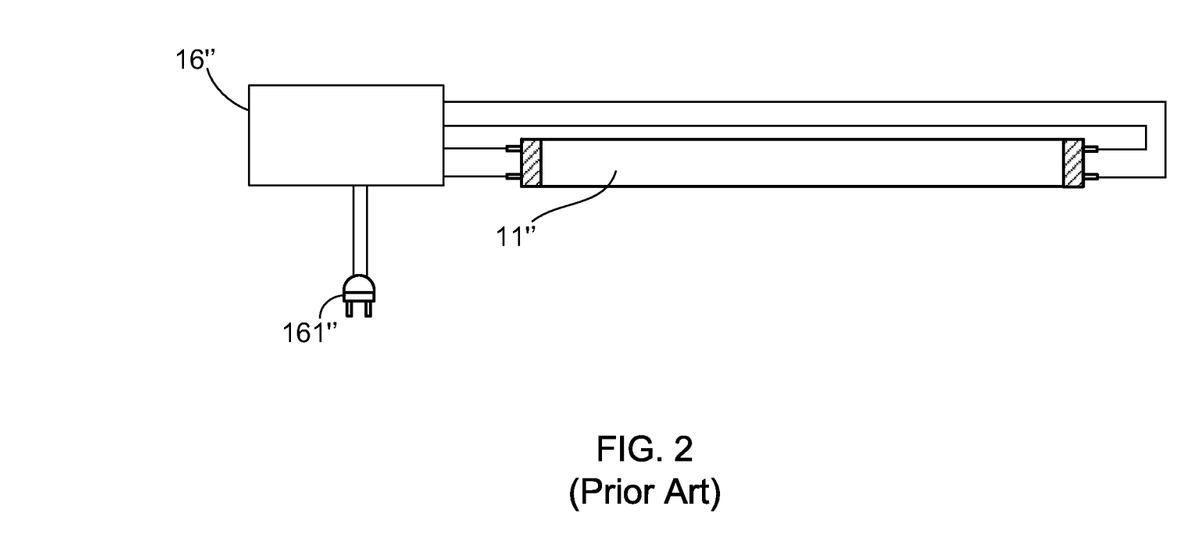
FIG. 2 is a framework diagram of an LED fluorescent lamp connecting with an electrical ballast.

Accordingly, in view of the conventional fluorescent lamp framework shows much shortcomings and drawbacks as well as the traditional fluorescent lamps is getting to be replaced by LED fluorescent lamps, fluorescent lamp manufacturers propose an electrical ballast for controlling the LED fluorescent lamp. Please refer to FIG. 2, which illustrates a framework diagram of the LED fluorescent lamp connecting with the electrical ballast. As shown in FIG. 2, to established the framework of the LED fluorescent lamp connecting with the electrical ballast, it merely couples the four contacting terminals in the two ends of an LED fluorescent lamp 11" to an electrical ballast 16" and connects a power plug 161' of the electrical ballast 16" to a power outlet, such that the framework of the LED fluorescent lamp connecting with the electrical ballast has been established.

Figure 3:
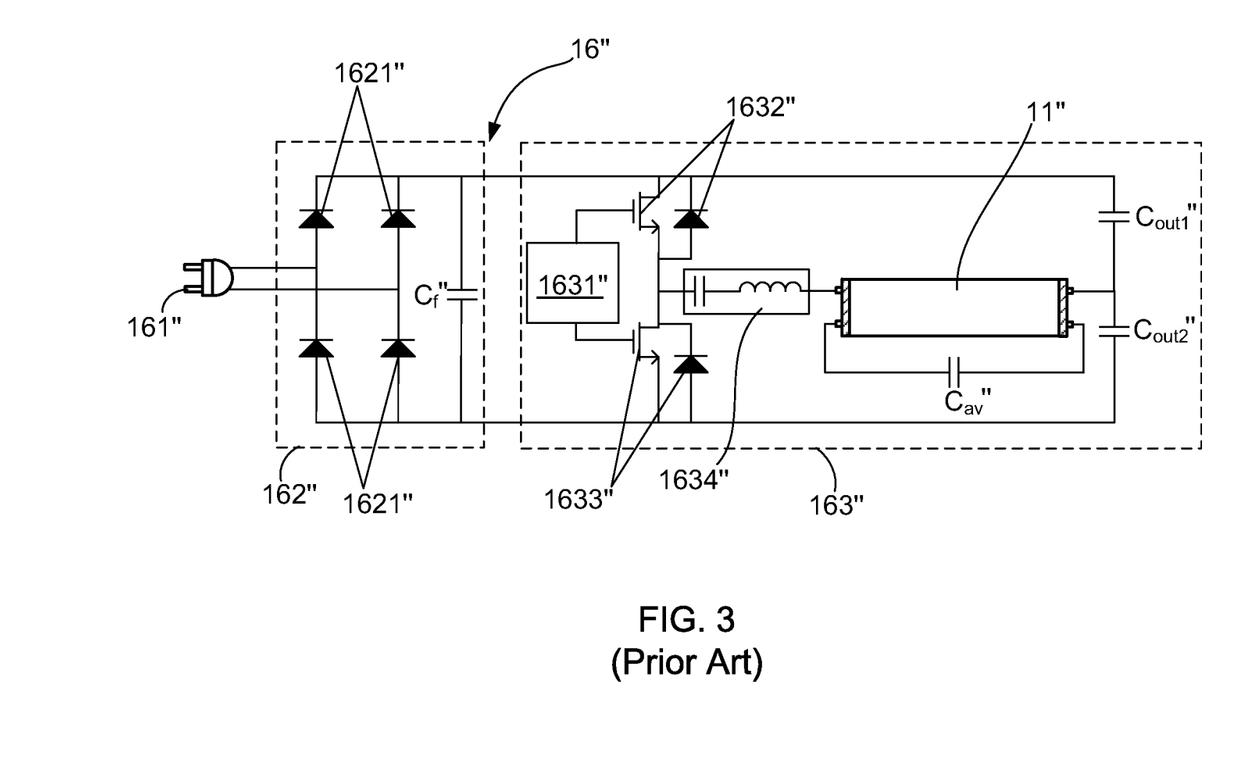
FIG. 3 is an inner framework view of the electrical ballast.

Continuously referring to FIG. 2, and simultaneously referring to FIG. 3, which illustrates a framework view of the inner circuit of the electrical ballast. As shown in FIG. 3, the electrical ballast 16" is consisted of an AC/DC converting circuit 162" and a DC/AC converting circuit 163". The AC/DC converting circuit 162" includes a Bridge rectifier circuit 1621" and a filtering capacitor $C_f"$, and the DC/AC converting circuit 163" includes a controlling unit 1631", a first switching unit 1632", a second switching unit 1633", a resonance unit 1634", an activating capacitor $C_{av}"$, a first outputting capacitor $C_{out1}"$, and a second outputting capacitor $C_{out1}"$. By way of such inner circuit framework of the electrical ballast 16", the LED fluorescent lamp 11" can be controlled to emit light.

Currently, the electrical ballast 16" is able to be miniaturized and integrated inside the LED fluorescent lamp 11" for facilitate the common people to replace the traditional fluorescent lamp with the LED fluorescent lamp 11"; However, as shown in FIG. 2 and FIG. 3, because the electrical ballast 16" is used the two contacting terminals of one end of the LED fluorescent lamp 11" as the power-inputting terminal, people needs to indentify which two contact terminals of the LED fluorescent lamp 11' are used as the power-inputting terminal in advance when replacing the traditional fluorescent lamp by the LED fluorescent lamp 11'. It is able to know that, such installing way of the LED fluorescent lamp 11' is very inconvenient for the common people.

Accordingly, in view of the conventional fluorescent lamp framework and the framework of the LED fluorescent lamp connecting with the electrical ballast still have shortcomings and drawbacks, the inventor of the present application has made great efforts to make inventive research thereon and eventually provided a lighting device controlling circuit module.

BRIEF SUMMARY OF THE INVENTION

The primary objective of the present invention is to provide a lighting device controlling circuit module for being integrated into an LED fluorescent lamp, such that a user can replace the traditional fluorescent lamp with the LED fluorescent lamp having the lighting device controlling circuit module so easily, and the user does not need to identify which two contacts of the LED fluorescent lamp are used as the power-inputting terminal before replacing the traditional fluorescent lamp by the LED fluorescent lamp.

Accordingly, for achieving the abovementioned objective, the inventor proposes a lighting device controlling circuit module, comprising;

a first bridge rectifier unit, coupled to a power source;

a second bridge rectifier unit, coupled to the power source;

a power factor correction unit, coupled with the first bridge rectifier unit and the second bridge rectifier unit and used for correcting a power signal outputted from the first bridge rectifier unit or the second bridge rectifier unit;

a controlling unit, coupled to the power factor correction unit for receiving the power signal corrected by the power factor correction unit, so as to further output a control signal, wherein the controlling unit has at least one single-stage oscillator and at least one comparator;

a feedback unit, coupled to the controlling unit for receiving the control signal;

at least one switching unit, coupled with the feedback unit and the controlling unit; and at least one boost/buck unit, coupled to the switching unit and has at least one activating inductor;

wherein when switching and controlling the lighting device to emit the light, the single-stage oscillator in the controlling unit outputs the control signal and the feedback unit couples the control signal to the switching unit, so as to turn on the switching unit; moreover, after the switching unit is turned on, the activating inductor of the boost/buck unit induces a current signal and outputs the current signal to the lighting device for driving the lighting device to emit the light;

wherein when the lighting device is emitting the light, the activating inductor feedbacks the current signal to the feedback unit, meanwhile, the feedback unit converts the current signal to a feedback voltage signal and outputs the feedback voltage signal to the controlling unit, then the comparator in the controlling unit monitors and compares the feedback voltage signal; therefore, once the peak value of the feedback voltage signal is greater than a specific voltage value, the controlling unit outputs the control signal to turn off the switching unit for keeping the current value of the current signal to a constant value.

BRIEF DESCRIPTION OF THE SEVERAL VIEWS OF THE DRAWINGS

The invention as well as a preferred mode of use and advantages thereof will be best understood by referring to the following detailed description of an illustrative embodiment in conjunction with the accompanying drawings, wherein.

DETAILED DESCRIPTION OF THE INVENTION

To more clearly describe a lighting device controlling circuit module according to the present invention, embodiments of the present invention will be described in detail with reference to the attached drawings hereinafter.

Figure 4:
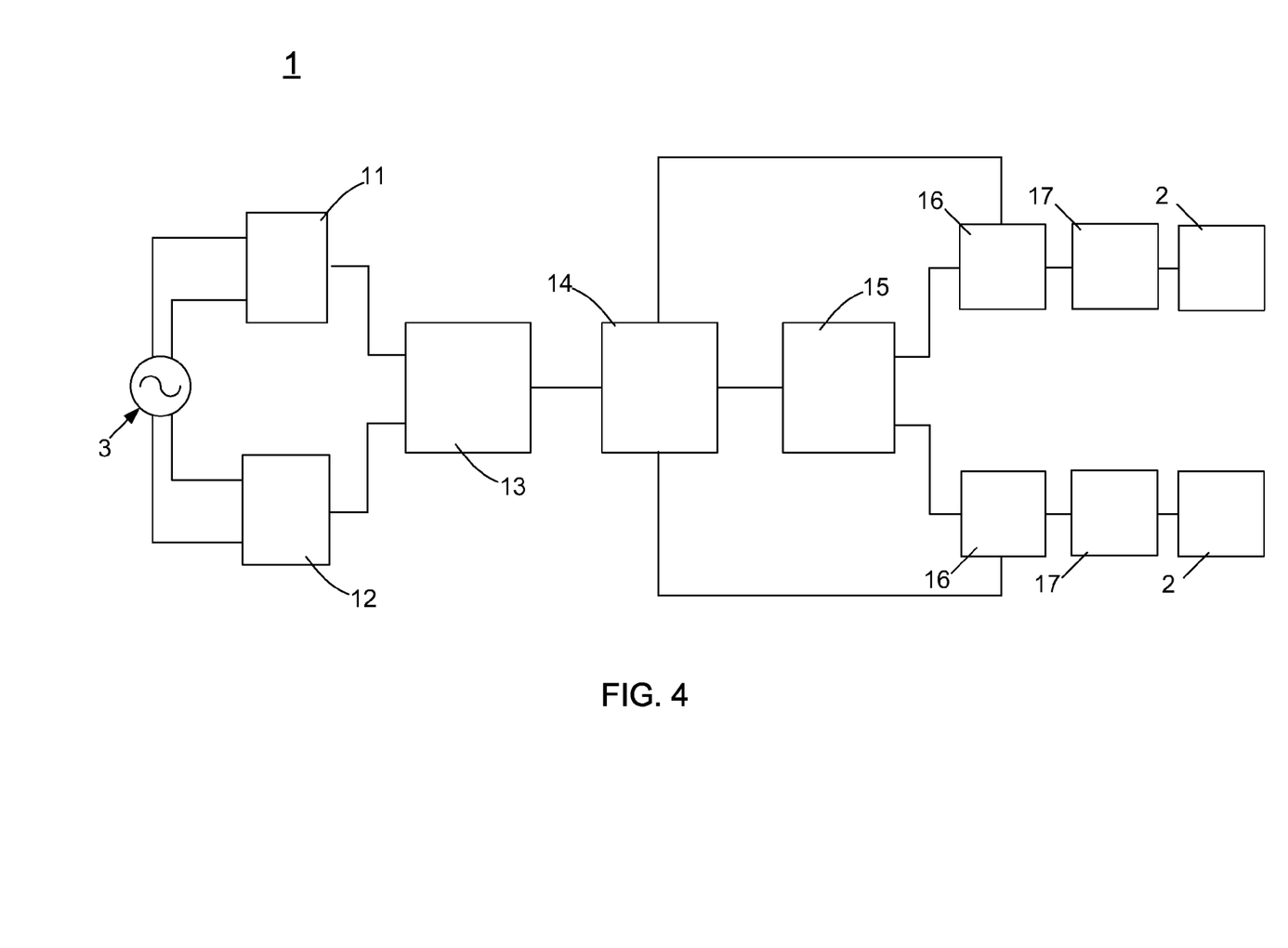
FIG. 4 is a framework diagram of a lighting device controlling circuit module according to the present invention.

Please refer to FIG. 4, which illustrates a framework diagram of a lighting device controlling circuit module according to the present invention. As shown in FIG. 4, the lighting device controlling circuit module 1 includes: a first bridge rectifier unit 11, a second bridge rectifier unit 12, a power factor correction unit 13, a controlling unit 14, a feedback unit 15, two switching units 16, two boost/buck units 17, and a voltage-regulating capacitor $C_{VR}$.

Figure 5:
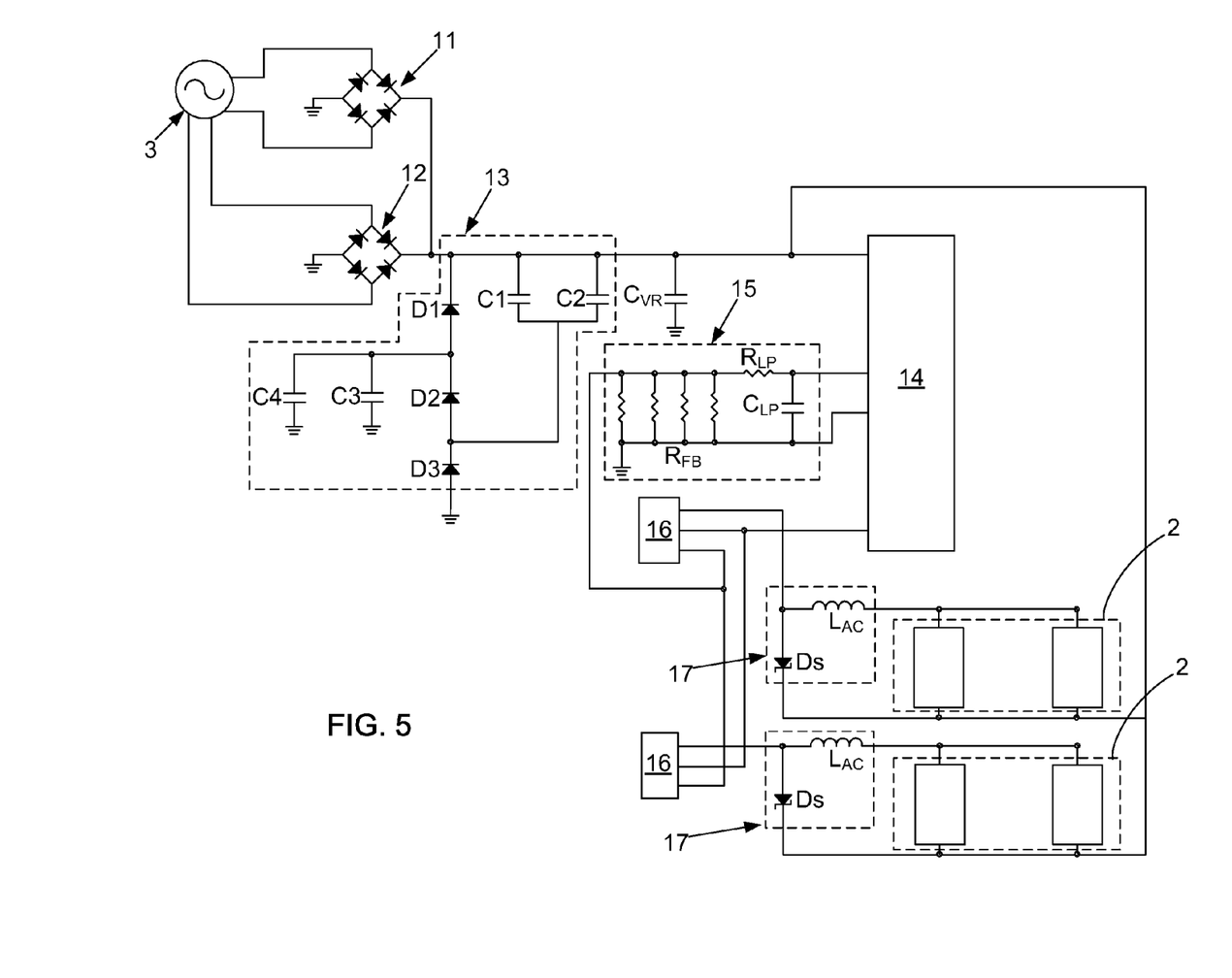
FIG. 5 is a framework of the inner circuit of the lighting device controlling circuit module.

Continuously referring to FIG. 4, and simultaneously referring to FIG. 5, which illustrates a framework of the inner circuit of the lighting device controlling circuit module. As shown in FIG. 4 and FIG. 5, the first bridge rectifier unit 11 and the second bridge rectifier unit 12 are coupled to a power source 3. The power factor correction unit 13 is consisted of a first diode D1, a second diode D2, a third diode D3, a first capacitor C1, a second capacitor C2, a third capacitor C3, and a fourth capacitor C4, and the power factor correction unit 13 is coupled to the first bridge rectifier unit 11 and the second bridge rectifier unit 12 for correcting a power signal outputted from the first bridge rectifier unit 11 or the second bridge rectifier unit 12.

The controlling unit 14 is coupled to the power factor correction unit 13 for receiving the power signal corrected by the power factor correction unit 13, so as to further output a control signal, wherein the controlling unit 14 has at least one single-stage oscillator (not shown in FIGS.) and at least one comparator (not shown in FIGS.). The feedback unit 15 is consisted of a low-pass filtering capacitor $C_{LP}$, a low-pass filtering resistor $R_{LP}$ and at least one feedback resistor $R_{FB}$ and coupled to the controlling unit 14 for receiving the control signal. In which, as shown in FIG. 5, the feedback resistor $R_{FB}$ includes four resistors parallel to each other. The two switching units 16 are coupled with the feedback unit 15 and the controlling unit 14, moreover, in the circuit framework of the lighting device controlling circuit module 1 of the present invention, the switching unit 16 can be a metal-oxide-semiconductor field-effect transistor (MOSFET) or a bipolar junction transistor (BJT), and preferably, in the embodiment of the lighting device controlling circuit module 1, the MOSFET is used as the switching unit 16.

The boost/buck unit 17 is consisted of a Schottky diode Ds and an activating inductor $L_{AC}$, and the boost/buck unit 17 is coupled to the switching unit 16. In the circuit framework of the lighting device controlling circuit module 1, when switching and controlling the lighting device 2 to emit the light, the single-stage oscillator in the controlling unit 14 outputs the control signal and the feedback unit 15 couples the control signal to the switching unit 16, so as to turn on the switching unit 16; moreover, after the switching unit 16 is turned on, the activating inductor $L_{AC}$ of the boost/buck unit 17 is charged and induces a current signal, furthermore, the activating inductor $L_{AC}$ outputs the current signal to the lighting device 2 for driving the lighting device 2 to emit the light. In addition, when the lighting device 2 is emitting the light, the activating inductor $L_{AC}$ feedbacks the current signal to the feedback unit 15, meanwhile, the feedback unit 15 converts the current signal to a feedback voltage signal and outputs the feedback voltage signal to the controlling unit 14, then the comparator in the controlling unit 14 would monitor and compare the feedback voltage signal; therefore, once the peak value of the feedback voltage signal is greater than a specific voltage value, the controlling unit 14 outputs the control signal to turn off the switching unit 16 for keeping the current value of the current signal to a constant value.

Thus, the circuit framework and the actuation principle of the lighting device controlling circuit module 1 have been completed introduced. Herein, it needs to make an especially statement of that the lighting device 2 can be an LED fluorescent lamp, an LED lamp or a traditional fluorescent lamp; besides, the numbers of the switching unit 16 and the boost/buck unit 17 are not limited to two. More clearly to explain that, if the number of the lighting device 2 connected to the lighting device controlling circuit module 1 is greater than two, the applied numbers of the switching unit 16 and the boost/buck unit 17 must to be adjusted according to the number of the lighting device 2.

Figure 6:
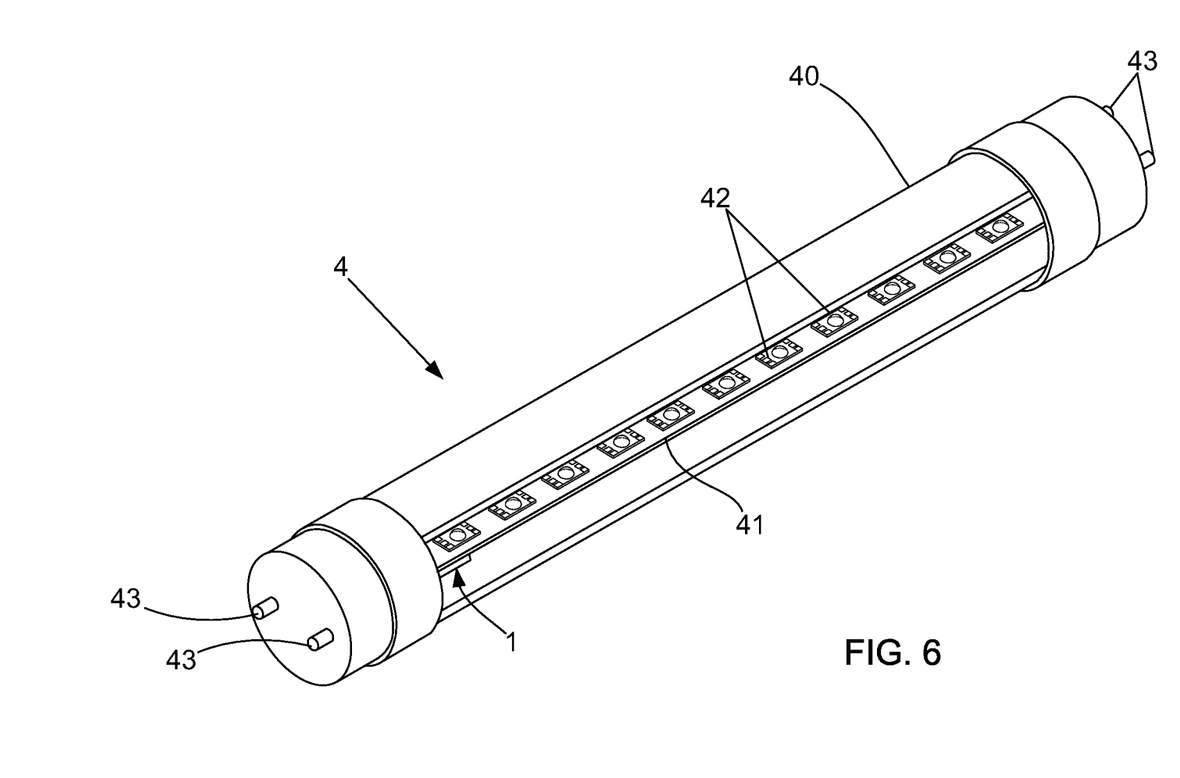
FIG. 6 is a stereo view of an LED fluorescent lamp integrated with the lighting device controlling circuit module.

Inheriting to above description, if it uses the LED fluorescent lamp as the lighting device 2, then the lighting device controlling circuit module 1 can be implemented on a printed circuit board and the lighting device 2 (LED fluorescent lamp) is consisted of a plurality of LED chips welded on the printed circuit board. Please refer to FIG. 6, which illustrates a stereo view of an LED fluorescent lamp integrated with the lighting device controlling circuit module. As shown in FIG. 6, the LED fluorescent lamp 4 integrated with the lighting device controlling circuit module 1 includes: a lampshade 40, a printed circuit board 41, a plurality of LED chips 42, and four power inputting terminals 43. As shown in FIG. 6, the lighting device controlling circuit module 1 is implemented on the printed circuit board, used for controlling the plurality of LED chips 42 to emit light; Moreover, the four power inputting terminals 43 of the LED fluorescent lamp 4 are respectively connected to the two bridge rectifier units 11, 12 of the lighting device controlling circuit module 1. Therefore, when a user want to replace the traditional fluorescent lamp with the LED fluorescent lamp 4 having the lighting device controlling circuit module 1, the user can directly and easily replace the traditional fluorescent lamp by the LED fluorescent lamp 4, and the user does not need to identify which two contacts of the LED fluorescent lamp 4 are used as the power-inputting terminal before doing the replacement.

Figure 7:
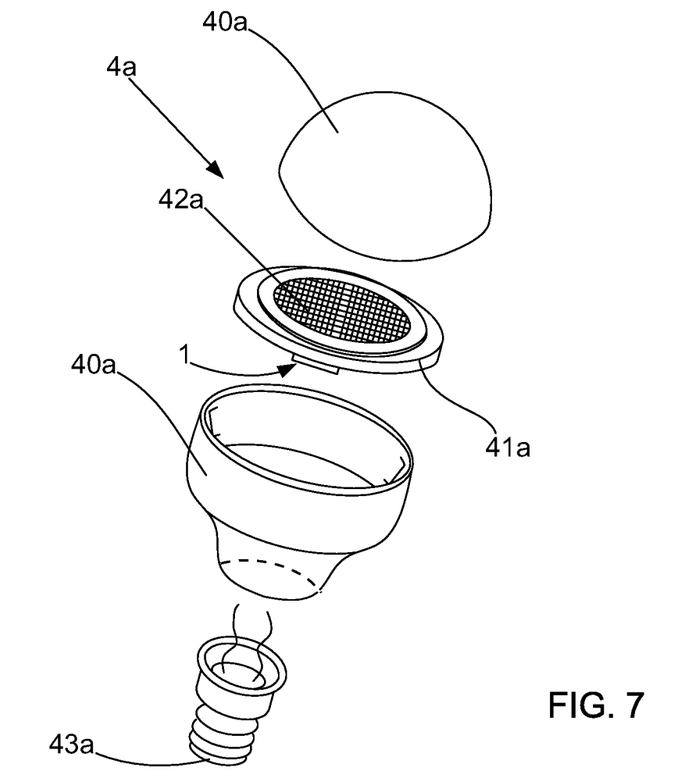
FIG. 7 is an exploded view of an LED lamp integrated with the lighting device controlling circuit module.

In addition, the lighting device controlling circuit module 1 of the present invention cam also be made to an electronic chip and further welded onto a printed circuit board with a plurality of LED chips. Please refer to FIG. 7, which illustrates an exploded view of an LED fluorescent lamp integrated with the lighting device controlling circuit module. As shown in FIG. 7, an LED lamp 4a integrated with the lighting device controlling circuit module 1 includes: a lampshade 40a, a printed circuit board 41a, a plurality of LED chips 42a, and a power inputting terminal 43a. In which the lighting device controlling circuit module 1 is made as the electronic chip and disposed on the printed circuit board 41a opposite to the plurality of LED chips 42a. Similarly, if the user wants to use the LED lamp 4a as a lighting device, the user merely couples the power inputting terminal 43a to a power source, i.e., putting the power inputting terminal 43a into a default power outlet, and that is so easy. Moreover, when the electronic chip of the lighting device controlling circuit module 1 is damaged, the user merely opens the lampshade 40a of the LED lamp 4a, then, the user is able to directly replace a new electronic chip, and the user does not need to identify which two contacts on the printed circuit board 41a are used as the power-inputting terminal.

Thus, through above descriptions, the lighting device controlling circuit module of the present invention has been clearly and completely introduced, so that, according to the above descriptions, it can easily understand that the present invention has the following advantages:

1. The lighting device controlling circuit module can be integrated inside an LED fluorescent lamp, and a user can directly replace the traditional fluorescent lamp by the LED fluorescent lamp having the lighting device controlling circuit module so easily, in addition, the user does not need to identify which two contacts of the LED fluorescent lamp are used as the power-inputting terminal before replacing the traditional fluorescent lamp by the LED fluorescent lamp.
2. The lighting device controlling circuit module can be made as an electronic chip for replacing the driving chip of the traditional LED lamp, moreover, when the electronic chip of the lighting device controlling circuit module is damaged, the user merely opens the lampshade of the LED lamp, then, the user can directly and easily replace a new electronic chip and not need to identify which two contacts on the printed circuit board are used as the power-inputting terminal.

The above description is made on embodiments of the present invention. However, the embodiments are not intended to limit scope of the present invention, and all equivalent implementations or alterations within the spirit of the present invention still fall within the scope of the present invention.

I claim:

1. A lighting device controlling circuit module, being electrically connected to at least one lighting device for controlling the lighting device to emit a light, and comprising:
    a first bridge rectifier unit, being coupled to a power source;
    a second bridge rectifier unit, being coupled to the power source;
    a power factor correction unit, being coupled with the first bridge rectifier unit and the second bridge rectifier unit, used for correcting a power signal outputted from the first bridge rectifier unit or the second bridge rectifier unit;
    a controlling unit, being coupled to the power factor correction unit for receiving the power signal corrected by the power factor correction unit, so as to further output a control signal, wherein the controlling unit has at least one single-stage oscillator and at least one comparator;
    a feedback unit, being coupled to the controlling unit for receiving the control signal;
    at least one switching unit, being coupled with the feedback unit and the controlling unit; and
    at least one boost/buck unit, being coupled to the switching unit and having at least one activating inductor;
    wherein when switching and controlling the lighting device to emit the light, the single-stage oscillator in the controlling unit outputting the control signal and the feedback unit coupling the control signal to the switching unit, so as to turn on the switching unit; moreover, after the switching unit is turned on, the activating inductor of the boost/buck unit inducing a current signal and outputting the current signal to the lighting device for driving the lighting device to emit the light;
    wherein when the lighting device is emitting the light, the activating inductor feedbacking the current signal to the feedback unit, meanwhile, the feedback unit converting the current signal to a feedback voltage signal and outputting the feedback voltage signal to the controlling unit, then the comparator in the controlling unit would monitor and compare the feedback voltage signal; therefore, once the peak value of the feedback voltage signal is greater than a specific voltage value, the controlling unit outputting the control signal to turn off the switching unit for keeping the current value of the current signal to a constant value.

2. The lighting device controlling circuit module of claim 1, further comprising a voltage-regulating capacitor, being coupled with the power factor correction unit and the controlling unit, used for regulating the voltage value of the power signal inputted into the controlling unit.

3. The lighting device controlling circuit module of claim 1, being able to be implemented on a printed circuit board and further integrated with the at least one lighting device.

4. The lighting device controlling circuit module of claim 1, wherein the power factor correction unit is consisted of a first diode, a second diode, a third diode, a first capacitor, a second capacitor, a third capacitor, and a fourth capacitor.

5. The lighting device controlling circuit module of claim 1, wherein the feedback unit is consisted of a low-pass filtering capacitor, a low-pass filtering resistor and at least one feedback resistor.

6. The lighting device controlling circuit module of claim 1, wherein the switching unit is selected from the group consisting of: metal-oxide-semiconductor field-effect transistor (MOSFET) and bipolar junction transistor (BJT).

7. The lighting device controlling circuit module of claim 1, wherein boost/buck unit further comprises at least one Schottky diode.

8. The lighting device controlling circuit module of claim 1, wherein lighting device is selected from the group consisting of: light-emitting diode (LED) fluorescent lamp, LED lamp and fluorescent lamp.

9. The lighting device controlling circuit module of claim 8, being able to be implemented on a printed circuit board and a plurality of LED chips can be further welded onto the printed circuit board for being the lighting device.

10. The lighting device controlling circuit module of claim 8, capable of being made to an electronic chip and further welded onto a printed circuit board with a plurality of LED chips.

* * * * *